(12) United States Patent
Van Der Loo

(10) Patent No.: US 10,219,086 B2
(45) Date of Patent: Feb. 26, 2019

(54) MOBILE WIRELESS CONTROLLER FOR A HEARING AID

(71) Applicant: AN Direct B.V., Rotterdam (NL)

(72) Inventor: Bram Willem Van Der Loo, Rotterdam (NL)

(73) Assignee: AN DIRECT B.V., Rotterdam (NL)

( * ) Notice: Subject to any disclaimer, the term of this patent is extended or adjusted under 35 U.S.C. 154(b) by 0 days.

(21) Appl. No.: 15/905,432

(22) Filed: Feb. 26, 2018

(65) Prior Publication Data

US 2018/0184218 A1  Jun. 28, 2018

Related U.S. Application Data

(63) Continuation of application No. 15/301,665, filed as application No. PCT/NL2015/050209 on Apr. 1, 2015, now Pat. No. 9,906,877.

(30) Foreign Application Priority Data

Apr. 1, 2014  (NL) ..................................... 2012543

(51) Int. Cl.
*H04R 25/00*    (2006.01)
*H04W 12/06*    (2009.01)
(Continued)

(52) U.S. Cl.
CPC ......... *H04R 25/558* (2013.01); *G06F 21/305* (2013.01); *H04R 25/554* (2013.01);
(Continued)

(58) Field of Classification Search
CPC combination set(s) only.
See application file for complete search history.

(56) References Cited

U.S. PATENT DOCUMENTS 8,280,086 B2   10/2012  Topholm
9,774,961 B2 *  9/2017  Solum .................. H04R 25/554
(Continued)

FOREIGN PATENT DOCUMENTS

WO   2006087503 A1   8/2006
WO   2007076456 A2   7/2007

OTHER PUBLICATIONS

International Search Report and Written Opinion for International application No. PCT/NL2015/050209, dated Jun. 8, 2015.
(Continued)

*Primary Examiner* — Amir Etesam
(74) *Attorney, Agent, or Firm* — Steven M. Koehler; Westman, Champlin & Koehler, P.A.

(57) ABSTRACT

The invention relates to a method for configuring a mobile user device as a remote controller for a hearing aid, said mobile user device, comprising a removable secure digital (SD) card, comprising a radio interface and an antenna controller for configuring said radio interface for wireless communication with said hearing aid; and, a computer-readable memory for storing a software application for remotely controlling said hearing aid via said communication module; said method comprising: requesting a communication module identifier, from said communication module; sending a request for hearing aid setting information associated with said hearing aid to a server, said request comprising said communication module identifier; receiving at least part of said hearing aid setting information if said server determines on the basis of said communication module identifier that access to said hearing aid setting information by said mobile user device is allowed; and, configuring the radio interface of said communication module on the basis of said hearing aid setting information.

16 Claims, 6 Drawing Sheets

(51) Int. Cl.
   *G06F 21/30*    (2013.01)
   *H04L 29/06*    (2006.01)

(52) U.S. Cl.
   CPC ............. *H04W 12/06* (2013.01); *G06F 21/30*
         (2013.01); *H04L 63/00* (2013.01); *H04R 25/00*
                  (2013.01); *H04R 25/55* (2013.01)

(56) References Cited

U.S. PATENT DOCUMENTS

| | | |
|---|---|---|
| 2005/0008175 A1* | 1/2005 | Hagen .................... H04R 25/70 |
| | | 381/314 |
| 2006/0274747 A1 | 12/2006 | Topholm |
| 2008/0049957 A1 | 2/2008 | Topholm |
| 2010/0033310 A1 | 2/2010 | Narendra |
| 2011/0090837 A1 | 4/2011 | Duchscher |
| 2013/0004002 A1 | 1/2013 | Duchscher |
| 2014/0066019 A1 | 3/2014 | Vodafone |

OTHER PUBLICATIONS

European Office Action dated Apr. 18, 2018 for corresponding European Patent Application No. 15719862.3, filed Apr. 1, 2015.

* cited by examiner

MOBILE WIRELESS CONTROLLER FOR A HEARING AID

CROSS-REFERENCE TO RELATED APPLICATION

The present application is a continuation of and claims priority of U.S. patent application Ser. No. 15/301,665, filed Oct. 3, 2016, which claims priority of International patent application Serial No. PCT/NL2015/050209, filed Apr. 1, 2015, and published in English, the content of which is hereby incorporated by reference in its entirety.

FIELD OF THE INVENTION

The invention relates to a mobile wireless controller for a hearing aid and, in particular, though not exclusively, to a method for configuring a mobile user device as a mobile wireless controller for a hearing aid, a mobile user device configured as a wireless controller for a hearing aid, a communication module for use with a mobile user device configured as a wireless controller for a hearing aid and a computer program product for using such method.

BACKGROUND OF THE INVENTION

Currently hearing aids are provided with a wireless interface in order to offer additional functionality to the user. This way the hear aid may be wirelessly linked to a television, an audio streaming device, a mobile phone, etc. Additionally, the wireless link may be used to control the hearing aid, e.g. controlling the settings of e.g. its filters and/or volume, or to update parts of the software and/or settings of the hearing aid software. Due to energy and health constraints, the wireless link of the hearing aid is typically configured as a low-energy wireless link that uses a relatively low carrier frequency between 0.1 and 500 MHz.

Different hearing aids manufactures implement their own proprietary wireless interfaces in their products. Each manufacturer uses its own carrier frequency and its own protocol stack software for establishing a wireless data link with the hearing aid. Due to these differences only dedicated remote control devices are available on the market that only work with hearing aids of one particular manufacturer. Hence, the user of a hearing aid needs to buy a separate proprietary remote control device that is especially designed for a hearing aid of a particular manufacturer. Typically, these remote control devices cannot be used with hearing aids of other manufacturers. U.S. Pat. No. 8,280,086 describes a remote control system for a hearing aid that is configured as a "plug-in" device for a mobile phone. The plug-in device can be connected to the mobile phone via the power bus connector and comprises a radio link that can make wireless contact with a particular hearing aid. When plugged-in, an application program in the plug-in device configures the mobile phone as a remote control for the hearing aid. Although this solution eliminates the needs for a separate remote control device, the plug-in does not provide a simple, secure and flexible wireless control solution for hearing aids of different manufactures working on different data carrier frequencies and different protocol stacks.

Hence, there is a need in the art for improved methods and system that allow wireless control of a hearing aid. In particular, there is a need in the art for methods and systems that provide simple, secure and flexible wireless control functions for different types of hearing aids of different manufacturers.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium (s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, ietc, or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. In an aspect the invention may relate to a computer-implemented method for configuring a mobile user device as a wireless controller for a hearing aid, wherein said mobile user device comprises a removable communication module comprising a radio interface and an antenna controller for configuring said radio interface for wireless communication with said hearing aid; and, a computer-readable memory for storing a software application for remotely controlling said hearing aid on the basis of said communication module. The communication module may be connectable to a configuration module on a computer or a (remote) server for configuring said communication module on the basis of hearing aid setting information.

In an embodiment, the method may comprise: sending authentication information, preferably (part of) the communication module serial number (CID), to said configuration module; receiving hearing aid setting information from said configuration module, if said configuration module determines on the basis of said authentication information that access to said hearing aid setting information by said communication module is allowed; and, configuring at least part of said communication module, preferably the radio interface of said communication module, on the basis of said hearing aid setting information.

Hence, the invention provides a generic platform for configuring a mobile device as a hearing aid controller that does not have the shortcomings of the prior art. The communication module provides a configurable radio link, preferably a configurable FM/AM radio link, a Bluetooth communication link or field magnetic induction (FMI) communication link that can be securely configured by a professional, e.g. an audiologist, to set up a wireless communication link for different types of hearing aids of different manufactures. Specifications and settings of the communication module and the hearing device may be stored in a user account on a computer or a server in the network and can be securely sent to the communication module that may use the information to configure its radio interface. The system is very flexible in the sense that if a new hearing aid is used, new hearing aid SD settings can be retrieved via the user account in order to configure the radio interface of the communication module for the new hearing aids. Furthermore, the communication module may be easily interchanged between different mobile devices without the necessity to reconfigure software or hardware components. The communication interface may be implemented as a chip card, e g. a smart card or the like.

In an embodiment, configuring said communication module may comprise: instructing said antenna controller to set the carrier frequency of said radio interface on the basis of frequency information in said hearing aid SD setting information, preferably said carrier frequency being selected from a frequency range between 0.1 and 900 MHz, preferably between 0.5 and 800 MHz, more preferably between 1 and 600 MHz. Hence, different carrier frequencies user by different hearing aid manufactures may be selected in order to set up a radio interface that is suitable for a particular hearing aid model.

In an embodiment, said hearing aid setting information may comprise protocol stack software and wherein configuring said communication module further comprises: instructing said communication module to install said protocol stack software in the memory of said communication module, said protocol stack software enabling said radio interface to establish a communication link with said hearing aid. Hence, a particular protocol stack used by a hearing aid manufacturer may be installed on the communication module so that the communication module is able to communicate with the hearing aid.

In an embodiment, said method may further comprise: receiving an password from said from said configuration module; storing at least part of said hearing aid setting information in a secure memory of said communication module, if said password matches an password that is stored in said communication module. The password of the communication module may be used to store data in the secure memory of the communication module. This way at least part of the hearing aid setting information may be securely stored in the memory of the communication module. In an embodiment, said hearing aid setting information may further comprise a first hearing aid identifier (ID). In yet another embodiment, said method may further comprise: establishing a wireless communication link between the communication module and the hearing aid; receiving second hearing aid ID from the hearing aid; determining successful configuration of the communication module on the basis of said first and second hearing aid ID. Hence, when establishing a radio contact with the hearing aid, the communication module may receive a hearing aid ID from the hearing aid and use this ID to check whether the communication module is allowed to make contact with the hearing aid.

In an embodiment, said method may further comprise: the software application rendering a graphical user interface comprising one or more touch-sensitive areas for controlling one or more parameters of said hearing aid; upon selecting at least one of said touch-sensitive areas, determining a user-selected parameter value for said hearing aid; instructing said communication module to transmit a hearing aid control message comprising said user-selected parameter value via said radio interface to said hearing aid, said hearing aid control message instructing a processor in said hearing device to configure said hearing device in accordance with said parameter value.

In an embodiment, said method may further comprise: the software application rendering a graphical user interface comprising one or more touch-sensitive areas for selecting one or more audio signals, preferably an audio signal originating from a media player and/or a telephone module in said user device; upon selecting at least one of said touch-sensitive areas, receiving at least one of said one or more selectable audio signal; instructing said communication module to transmit said audio signal via the radio interface of the communication module to said hearing aid.

In an embodiment, said method may further comprise: the software application rendering a graphical user interface comprising one or more touch-sensitive areas for selecting a predefined user configuration of said hearing aid; upon selecting at least one of said touch-sensitive areas, determining predefined hearing aid settings and/or a hearing aid software update; instructing said communication module to transmit a hearing aid control message comprising said predefined hearing aid settings and/or a hearing aid software update via said interface link to said hearing aid, said hearing aid control message instructing a processor in said hearing aid to configure the hearing aid in accordance with said predefined hearing aid settings and/or a hearing aid software update.

Hence, the software application in the mobile user device may generate a GUI that allows the user to select certain parameters and/or processes (e.g. a software update) and use the communication module to configure the mobile user device as a wireless control of the hearing aid.

In an embodiment said antenna controller may be further connected to an antenna interface for connecting an external antenna to said communication module.

In an embodiment, said method may further comprise: detecting the connection of an external antenna to said communication module; using said external antenna for establishing a wireless communication link between the communication module and the hearing aid.

In another aspect, the invention may relate to a user device configured as a wireless controller for a hearing aid wherein the user device may comprise: a communication interface for communicating with a removable communication module, said module comprising a configurable radio interface and an antenna controller for configuring said radio interface to wirelessly communicate with said hearing aid; a computer-readable memory for storing a software application for remotely controlling said hearing aid via said communication module; wherein said communication module is connectable to an configuration module on a computer or a server for configuring said communication module on the basis of hearing aid setting information. In an embodiment, said communication module may comprise a microcontroller that is configured for: sending authentication information, preferably (part of) the communication module serial number (CID), to said SD configuration module; receiving hearing aid setting information from said configuration module, if said configuration module determines on the basis of said communication module authentication information that access to said hearing aid setting information by said communication module is allowed; and, configuring at least part of said communication module, preferably the radio interface of said communication module, on the basis of said hearing aid setting information.

In an embodiment, said software application may be configured for: rendering a graphical user interface comprising one or more touch-sensitive areas for controlling one or more parameters of said hearing aid; upon selecting at least one of said touch-sensitive areas, determining a user-selected parameter value for said hearing aid; instructing said communication module to transmit a hearing aid control message comprising parameter value via said radio interface to said hearing aid, said hearing aid control message instructing a processor in said hearing device to configure said hearing device in accordance with said parameter value.

In an embodiment, the invention may relate to a communication module for use with a mobile user device, wherein said mobile user device comprises a software application for remotely controlling a hearing aid via said communication module, said communication module comprising: a configurable radio interface; a memory; and, a microcontroller connected to said configurable radio interface and said memory; wherein said microcontroller is configured for: sending authentication information, preferably (part of) the communication module serial number (CID), to said configuration module; receiving hearing aid setting information from said configuration module, if said configuration module determines on the basis of said communication module authentication information that access to said hearing aid setting information by said communication module is allowed; and, configuring at least part of said communication module, preferably the radio interface of said communication module, on the basis of said hearing aid setting information.

In an embodiment, configuring said communication module may comprise: instructing said antenna controller to set the carrier frequency of said radio interface on the basis of frequency information in said hearing aid setting information, preferably said carrier frequency being selected from a frequency range between 0.1 and 900 MHz, preferably between 0.5 and 800 MHz, more preferably between 1 and 600 MHz.

In an embodiment, said hearing aid SD setting information may comprises protocol stack software and/or configuring said communication module may further comprise: instructing said communication module to install said protocol stack software in the memory of said communication module, said protocol stack software enabling said radio interface to establish a communication link with said hearing aid.

In an embodiment, said microcontroller may be further configured to: receiving an password from said from said configuration module; storing at least part of said hearing aid setting information in a secure memory of said communication module, if said SD password matches an SD password that is stored in said communication module.

In an embodiment said hearing aid SD setting information may further comprise a first hearing aid identifier (ID). In another embodiment, said microcontroller may be further configured to: establishing a wireless communication link between the communication module and the hearing aid; receiving second hearing aid ID from the hearing aid; determining successful configuration of the communication module on the basis of said first and second hearing aid ID. In an embodiment, said antenna controller may be further connected to an antenna interface for connecting an external antenna to said communication module.

In an embodiment, said microcontroller or said antenna controller is further configured to: detecting the connection of an external antenna to said communication module; using said external antenna for establishing a wireless communication link between the communication module and the hearing aid.

In an embodiment, said communication module may comprise two or more electrical contacts for electrically connecting said external antenna to the antenna interface of the communication module, preferably said external antenna being configured as an inductive coil on a sticker that can be attached to an area of said communication module. In an embodiment, said external antenna may comprise an inductive coil on a substrate, wherein said inductive coil comprises two coil contacts for electrical contact with said antenna interface, preferably the size of said substrate being configured to be smaller than the size of the communication module. Hence, the external antenna be configure as a sticker comprising an inductive coil that that it can be easily connected to the communication module.

In a further embodiment, the antenna of said communication module may be configured as a magnetic inductive element comprising a magnetic core and an inductor coil wound around the magnetic core, wherein the magnetic inductive element is located on the communication module.

In yet a further aspect, the invention may relate to a communication module for use with a mobile user device, wherein said mobile user device comprises a software application for remotely controlling a hearing aid via said communication module, said module comprising: a configurable radio interface comprising an antenna and an antenna controller; a memory; and, a microcontroller connected to said configurable radio interface and said memory; wherein said microcontroller is configured for: receiving hearing aid setting information; and, configuring the radio interface of said communication module as an FM-based radio interface on the basis of said hearing aid setting information.

The invention may also relate to a computer program product comprising software code portions configured for, when run in the memory of a computer, executing the method steps according to any of method steps described above.

The invention will be further illustrated with reference to the attached drawings, which schematically will show embodiments according to the invention. It will be understood that the invention is not in any way restricted to these specific embodiments.

DETAILED DESCRIPTION

Figure 1A:
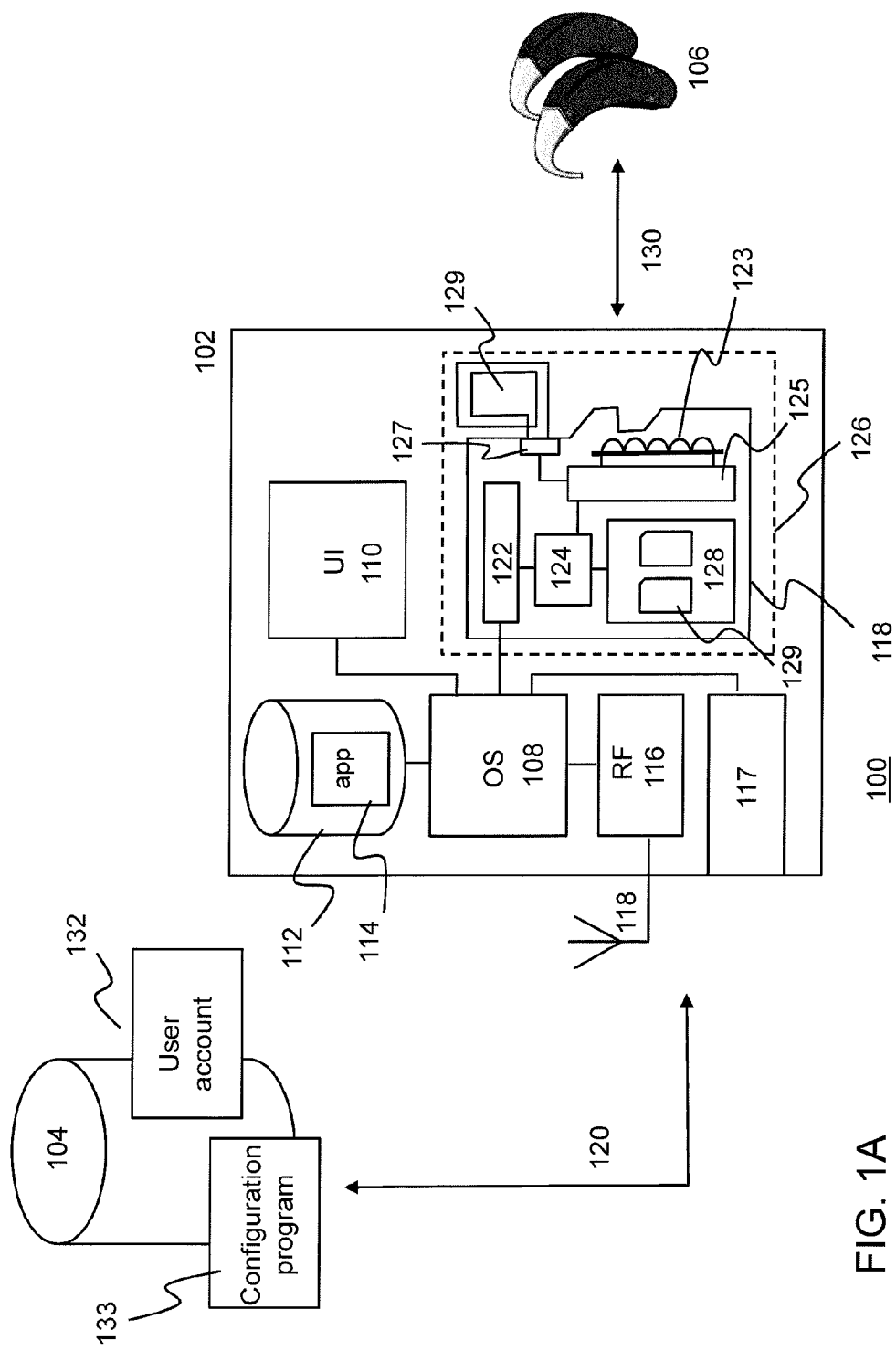
FIGS. 1A and 1B schematically depict a system for using a mobile device as a wireless hearing aid controller according to an embodiment of the invention.
Figure 1B:
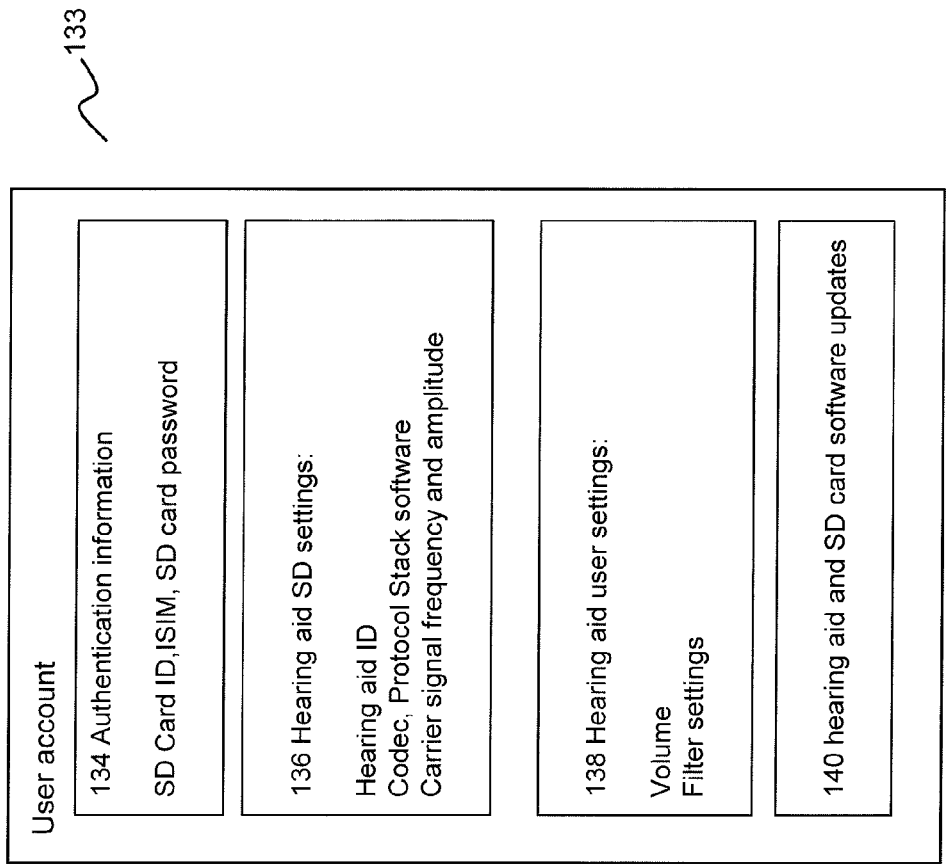

FIGS. 1A and 1B schematically depict a system for using a mobile device as a wireless hearing aid controller according to an embodiment of the invention. In particular, FIG. 1A depicts a system 100 comprising a mobile user device 102, a server 104 and at least one hearing aid 106. The user device may comprise a communication module that can be removable mounted on the user device. In an embodiment, the user device may comprise a socket for removable mounting the module. As will be described hereunder in more detail, the communication module comprises a configurable radio interface that can be configured for establishing a communication link with the hearing aid.

The mobile device may comprise one or more conventional radio modules 116 (e.g. a Wi-Fi module, a 3G or 4G radio module and/or a Bluetooth module). Further, the mobile device may comprise a data bus interface 117, e.g. an USB interface or the like, for establishing a hard wire external data link with other electronic devices. A processor 108 in the mobile user device may execute an operating system 109 in order to control the resources of the user device, including e.g. memory 112, the radio module 116, the data base, a user interface (UI) 110 and the communication module 118. A hearing aid application program 114 stored in the memory of the mobile user device may comprise software code portions that—when executed by the processor—allow the mobile user device to connect to the server 104 that hosts one or more server applications. A server application may be used by the user and/or audiologist for accessing a user account 132.

The communication module 118 may comprise user device interface 122 for providing connection between the user device and the communication interface model. For example, when implemented as a chip card the user device may include electrical contacts so that when inserted in a socket 126 of the mobile user device, chip card makes electrical contact with the data bus that is connected to the processor 108 of the user device. The communication module further comprises an microcontroller 124 that is configured to manages the resources of the communication module, including a memory 128, e.g. a flash memory, and a radio interface comprising an (on-chip) configurable antenna 123 and an antenna controller 125 for setting up a communication link 130 between the communication module and the hearing aid. The communication module may be implemented as a chip card, for example a chip card of one of the known (standardized) chip card formats, e.g. smart card or secure digital (SD) card, including the mini or micro SD format, the SDHC and the SDXC card formats and/or any equivalents thereof.

In a further embodiment (not shown), instead and/or in addition to a radio interface, the communication module may comprise a near-field magnetic induction (NFMI) module for establishing a near-field magnetic induction communication link between the communication module and the hearing aid. For the purpose of this disclosure, the term radio interface includes a NFMI interface for establishing a NFMI communication link.

In an embodiment, the antenna may be implemented as a magnetic inductive element comprising a magnetic core and an inductor coil wound around the magnetic core. In an embodiment, the radio interface may be configured to set up communication link that uses a field strength that is selected from a range between −50 dB μA/m in 10 m distance and −5 dB μA/m in 10 m distance. In an embodiment the radio interface may be operated at a carrier frequency selected between 0.1 and 800 MHz, preferably between 0.5 and 600 MHz, more preferably between 1 and 400 MHz. In another embodiment, the radio interface may be configured as a frequency modulation (FM) or an amplitude modulation (AM) radio interface. In yet another embodiment, the radio interface may be configured as a Bluetooth radio interface.

The antenna controller may further comprise an antenna interface 127 for connecting an external antenna 129 to the communication module. In an embodiment, the external antenna may be configured as a flat (thin film or thick film) antenna so that it can fit into the space that houses the communication module. In an embodiment, the antenna controller may be configured to detecting the connection of an external antenna to said communication module. In that case, the antenna controller may use the external antenna for establishing a wireless communication link between the communication module and the hearing aid.

As shown in FIG. 1B, the user account may be formatted as a database structure 133 comprising one or more data fields 134-140 that comprise information for configuring the communication module and the radio link between the communication module and the hearing aid. In another embodiment, the data fields may comprise information for controlling parameters settings and/or software versions of the hearing aid.

For example, in an embodiment, the user account may comprise authentication information 134 in the form of one or more identifiers and/or passwords. For example, in an embodiment, the authentication information may comprise a module identifier, preferably (part of) the serial number of the communication module that is stored in the identification register (CID) of the communication module. The authentication information may further comprise a user identifier, e.g. the (I) SIM number of a smart card in the user device, and/or a password of the communication module. The password of the communication module may lock the reading and writing of the memory of the communication module, while other functions of the communication module may be accessible by an application.

In an embodiment, the user account may further comprise hearing aid setting information 136 for configuring the communication module, in particular the radio interface of the communication module. The hearing aid setting information may also be used for establishing a communication link with the hearing aid.

The hearing aid settings (hearing aid setting information) may include at least one of: audio coded software for transforming an audio signal into a particular data format that can be handled by the hearing aid, carrier frequency and amplitude of the radio signal that is used by the antenna controller of the communication module and protocol stack software of the wireless protocol that is used by the hearing aid. The protocol stack software enables the communication module to transmit data in a certain data format from the communication module to the hearing aid and to receive data in a particular data format from the hearing aid.

Further, in an embodiment, the hearing aid settings may comprise a conversion program that is configured to receive user input from the UI of the hearing aid application and to translate the user input (e.g. a selected parameter value (e.g. volume) or a selected filter setting) into a message format that can be sent on the basis of the hearing aid communication protocol to the hearing aid.

In a further embodiment, the user account may further comprise hearing aid user settings 138, i.e. predefined or user-defined hearing aid settings (e.g. audio and/or filter settings). The user account may also comprise software (firmware) updates 140 for the hearing aid or the communication module or a link, e.g. an URL, to a server that can be used for accessing and downloading such software updates.

The data in the user account may be used by a configuration program 133 that may be used by a qualified person, e.g. an audiologist, to configure the communication module for a particular hearing aid. The configuration program may set up a secure (direct) connection with the communication module in order to correctly configure the communication module.

For example, when the user buys a hearing aid in a hearing aid shop, the user may buy a communication module so that it can use a mobile device, e.g. a smart phone, as a wireless controller of the hearing aid. The audiologist may configure the hearing aid and the radio link of the communication module so that it can set-up a wireless radio link with the hearing aid. To that end, the audiologist may use the configuration program to select a particular hearing aid model of a particular manufacturer and store hearing aid setting information of the selected hearing aid model in the user account. The process of configuring the communication module and the radio link between the communication module and the hearing aid is described hereunder in more detail with reference to FIG. 2.

As shown in FIG. 1A, when configuring the communication module for a particular hearing aid, the memory of the communication module may be provided with one or more audio codecs and/or protocol stack software 129 for setting up the communication link between the communication module and the hearing aid. For example, the memory of the communication module may comprise a communications standard codec, such as G.722 (CCITT G.722 Wideband Speech Coding Standard, the CCITT G.722 wideband speech coding algorithm supporting bit rates of 64, 56 and 48 kbps). Depending on the type of hearing aid, other proprietary or public codecs and/or protocol stack software may be stored in the memory of the communication module.

The hearing aid application program 114 may be configured to render a graphical user interface (GUI) 110 to access the user account and/or to control the hearing aid. In particular, when interacting with one or more (touch-screen based) areas of the GUI, the hearing aid application program may instruct the communication module to configure the radio interface on the basis of the audio codec and the protocol stack software that are stored in communication module and establish a radio communication link with the hearing aid. Further, the hearing aid application may be configured to instruct the communication module to send certain instruction messages via the wireless radio link to the hearing aid in order to configure certain settings (e.g. volume and/or filter settings) of the hearing aid.

Hence, from the above, it follows that the system in FIGS. 1A and 1B provide a generic platform for configuring a mobile device as a wireless hearing aid controller that does not have the shortcomings of the prior art. The communication module provides a configurable radio interface that can be configured to set up a wireless communication link for different types of hearing aids of different manufactures. Specifications and settings of the communication module and the hearing device may be stored in a user account in the network and can be securely retrieved via a secure link from the Internet and used by the communication module to configure its radio interface so that is suitable for communicating with the hearing aids. The system is flexible in the sense that if a new hearing aid is bought or if an existing hearing aid needs to be update, new hearing aid settings can be retrieved via the user account in order to configure the radio interface of the communication module for the new or updated hearing aid. Furthermore, the communication module may be easily interchanged between different mobile devices without the necessity to reconfigure software or hardware components. As the communication module comprises secure memory that can only be read or writing when a specific password is provided, a secure wireless radio link can be set up.

Figure 2:
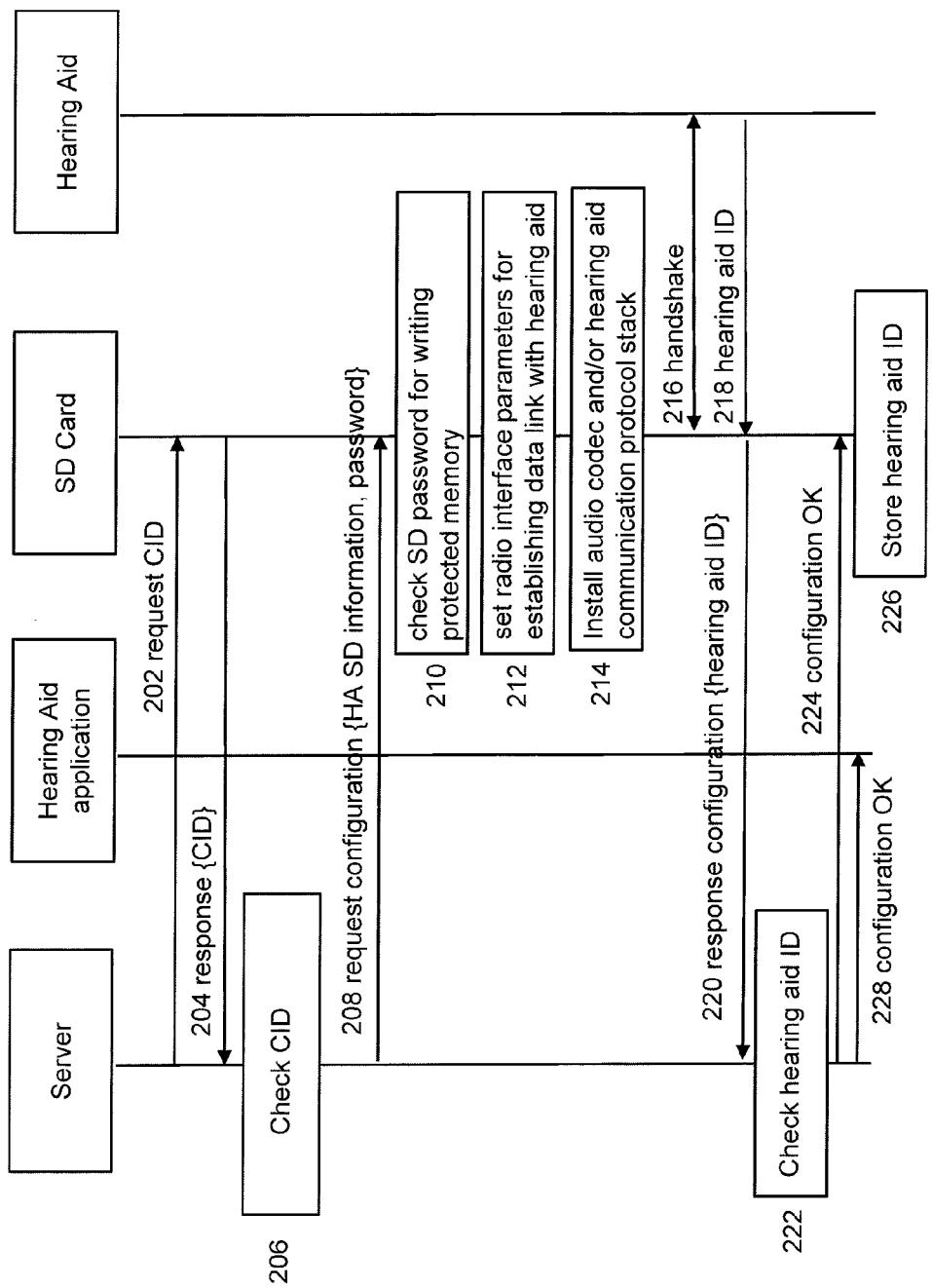
FIG. 2 depicts a flow diagram of a method for configuring a communication module for a mobile user device as a wireless controller for a hearing aid according to an embodiment of the invention.

FIG. 2 depicts a flow diagram of a method for configuring a communication module for a mobile user device as a wireless controller for a hearing aid according to an embodiment of the invention. Here, the mobile user device may comprise a communication module that is similar to the one described with reference to FIG. 1A.

The method of FIG. 2 may be particular useful in situation wherein a user would like to buy a hearing aid in combination with the wireless control functionality that is provided by the communication module. In that case, the audiologist may use the configuration program on a server or a computer in order to configure the communication module for the particular hearing aid. In an embodiment, the communication module may be connected to the user device by inserting the module in a socket so that the module makes electrical contact with the user device. This way the configuration program may access the communication module via the radio interface or the data bus interface of the mobile device. Alternatively, the communication module may be connected via a separate interface, e.g. socket (not shown), to the server or computer comprising the configuration program. When a user of a hearing aid buys the communication module, the audiologist may enter the communication module identifier, the password of the communication module, the hearing aid ID and/or the ISIM in the user account so that a secure connection between the configuration program and the communication module can be established.

The configuration program may send a request for a module identifier to the communication module (step 202). The request message may instruct the controller of the communication module to retrieve (part of) the serial number that is securely stored in the card identification register (CID).

In response to the request, the communication module may send a response message comprising the module identifier to the configuration program (step 204). In addition to the request of the module identifier, in some embodiments, a further request message may be, e.g. the (I) SIM of the communication module of the mobile user device. The request and messages may be sent over a secure HTTP/SLL connection between the server and the mobile user device. The configuration application may then authenticate the communication module by checking the module identifier in the response with a module identifier in the user account (step 206). In some embodiments the response message may also comprise a user ID, in that case the configuration program may also compare the user ID in the response message with the user ID in the user account.

If the authentication is successful, the configuration program may send a configuration message comprising the requested hearing aid information (step 208) to the communication module. The requested hearing aid information may comprise the information (audio codec, protocol stack, carrier frequency, etc.) that is needed to configure the communication module as a wireless radio interface to the hearing aid. In an embodiment, the configuration message may comprise the password of the communication module. The communication module may check the password and only after the validation of the password (step 210), the communication module may be unlocked for writing data into its secured memory.

Thereafter, the microcontroller in the communication module may execute the configuration request on the basis of the hearing aid information which may include any combination of the information as described with reference to FIG. 1B including: the radio interface for setting up a radio link with the hearing aid such as the carrier frequency (step 212) and the audio codec and/or protocol stack software that is used by the hearing aid for wireless communication (step 214) and user settings.

Hence, the microcontroller of the module may configure the communication module on the basis of the hearing aid information, which may include setting the antenna parameters, including the carrier frequency and/or the field strength, of the SD radio interface and/or installing the audio codec and/or protocol stack software.

Thereafter, the controller set up a low-power low-frequency wireless communication data link with the hearing aid using a handshake procedure in order set up the radio link (step 216). During the setup of the radio link the hearing aid may send a message to the communication module comprising the hearing aid ID. This hearing aid ID may be sent to the configuration program for verification (steps 218-224). If the hearing aid ID in the response configuration message corresponds to the hearing aid ID in the user account, the configuration program may decide that a radio link between the communication module and the correct hearing aid has been established. To that end, the configuration program may send a confirmation message to the communication module that a radio connection with the correct hearing aid has been established (step 224). This may trigger the communication module to store the hearing aid ID in the secure memory (step 224). A confirmation message may also be sent to a hearing aid application on the mobile user device (step 228). This way, the client may be informed that the hearing aid may be wirelessly controlled by the hearing aid application. The hearing aid application may allow user interaction using a GUI that is rendered by the hearing aid application on a (touch-sensitive) screen of the mobile user device.

In an alternative embodiment (not shown) the verification of the hearing aid ID (step 222) may be performed by the communication module. In that case, a hearing aid ID may be send by the configuration program to the communication module (e.g. as part of the hearing aid setting information as described with reference to step 208).

Hence, the above method enables the communication module in the user device to be set up as a secure radio link between the mobile user device and a hearing aid that is identified by a certain hearing aid ID. The hearing aid ID is securely stored in the memory of the communication module and cannot be modified without the use of the password. Similarly, predefined hearing aid user settings may be securely stored in the memory of the communication module so that the hearing aid settings can be wirelessly controlled wherein the risk of faults or damage to the hearing aid due to erroneous instructions by the user via the hearing aid application is minimized.

Figure 3:
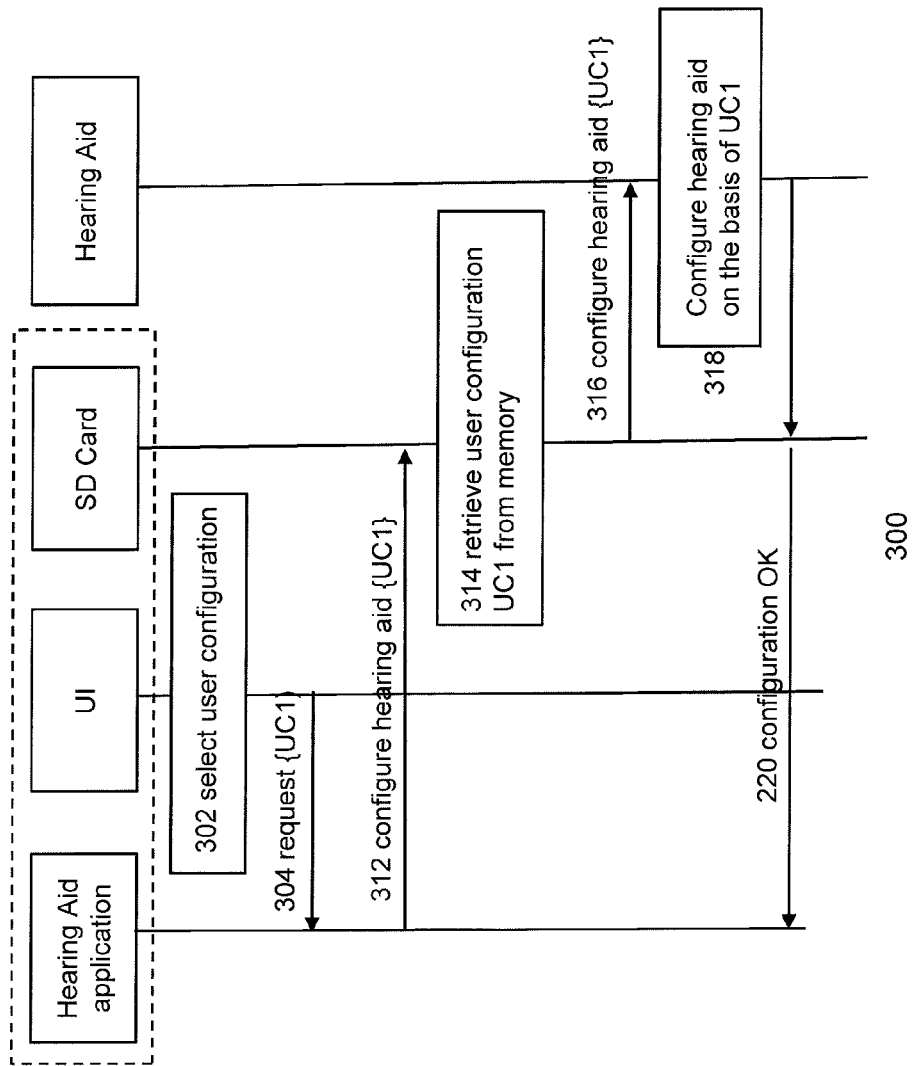
FIG. 3 depicts a flow diagram of a method of using a mobile user device as a wireless controller for a hearing aid according to an embodiment of the invention.

FIG. 3 depicts a flow diagram of a method of using a mobile user device as a wireless controller for a hearing aid according to an embodiment of the invention. In particular, FIG. 3 depicts a flow diagram of a method wherein a user interacts with a graphical user interface (GUI) which is rendered on a display of the user device. The user interface may be configured for selecting one or more parameters for configuring the hearing aid to the need of the user. For example, the (graphical) user interface may present the user with one or more user configurations (e.g. one or more hearing aid parameters (volume, audio and/or filter settings) that configure the hearing aid for certain situations, e.g. television, outdoors, noisy background, etc. In this particular situation, the communication module is configured for setting up a wireless communication link with the hearing aid using e.g. a method as described with reference to FIG. 2.

The process may start when the user interacts with a particular area of the GUI in order to select a certain user configuration UC1 (step 302). The selection will trigger the hearing aid application to send a request comprising a user configuration identifier to the communication module (step 306). When the communication module receives the request, it selects the requested user settings from the memory, establishes a wireless communication link with the hearing aid on the basis of the hearing aid ID and sends an instruction message to the hearing aid to configure the hearing aid on the basis of the user settings (steps 310 and 312). Once the configuration of the hearing aid is finished, it may send a confirmation back to the communication module, which may forward the configuration to the hearing aid application (step 314).

The method in FIG. 3 shows that the invention allows for easy configuration of a hearing aid on the basis of predefined information that is securely stored in the communication module and to control the hearing aid via said the wireless data link between the communication module and the hearing aid. This way, user-defined settings may be stored in the network and can be selected via a mobile user device when needed.

Figure 4:
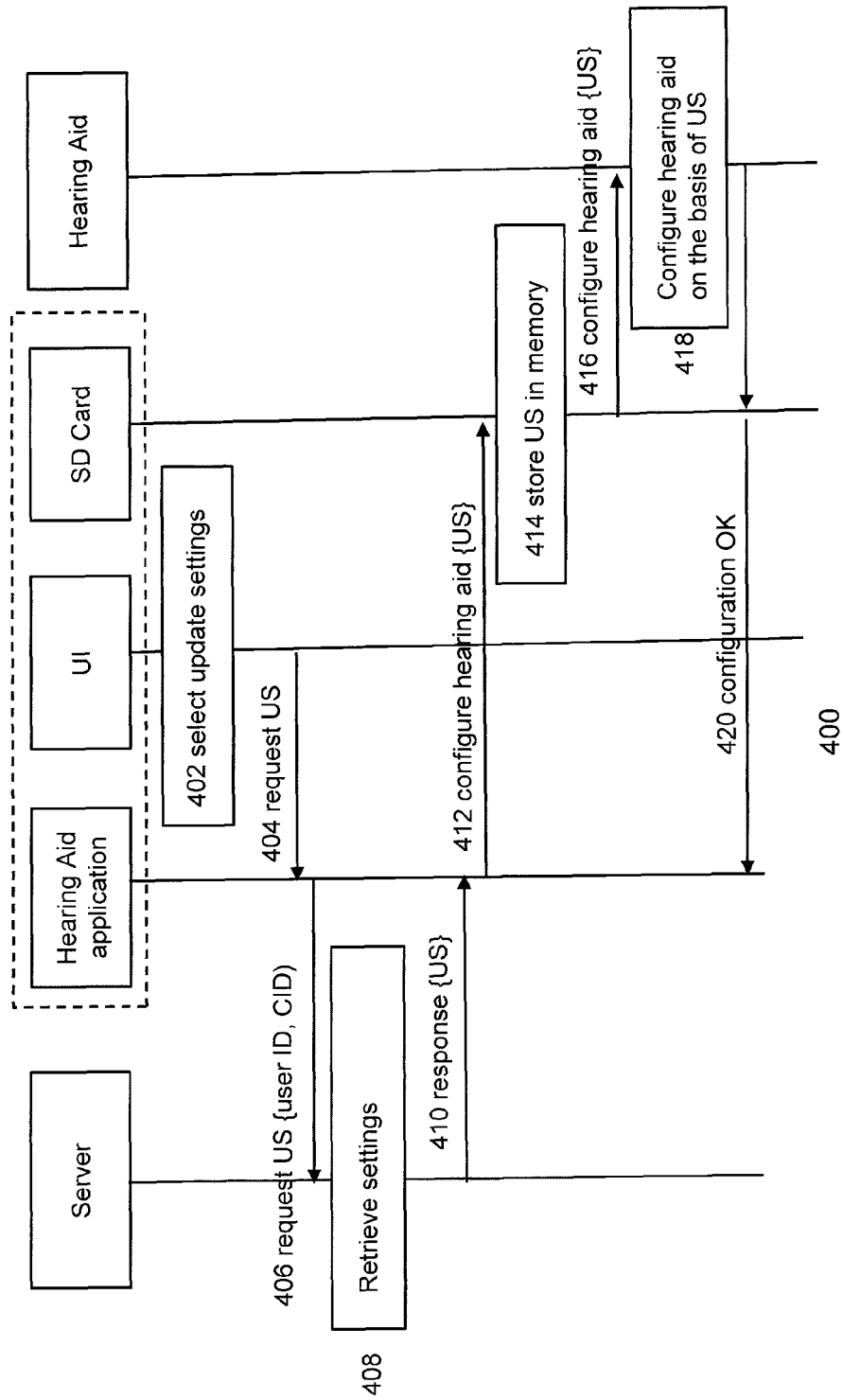
FIG. 4 depicts a flow diagram of a method of using a mobile user device as a remote controller for a hearing aid according to another embodiment of the invention.

FIG. 4 depicts a flow diagram of a method of using a mobile user device as a wireless controller for a hearing aid according to an embodiment of the invention. In particular, FIG. 4 depicts a flow diagram of a method wherein a user interacts with a user interface that is configured for selecting a software update for the hearing aid and/or communication module. The process may start with a user selecting the software update option via the GUI (step 402), which may trigger the hearing aid application to send a request for a software update to the communication module (steps 404 and 406). In response, the communication module may send a request for a software update to the configuration program that is hosted on the server (step 408) wherein the request may comprise a module identifier (CID). The configuration program may check the CID with the CID that is stored in the user account and if a successful match has been confirmed a software update message comprising the software update and a password to the communication module. After checking the password, the software update may be securely stored in the memory of the communication module (step 416).

Further, the communication module may set up a radio link with the hearing aid and transfer the software code or new hearing aid settings to the hearing aid (step 418). After completion of the installation of the software or settings, the hearing aid may send an acknowledgement message to the communication module (step 420). In an embodiment, the acknowledgement message may comprise the hearing aid identifier. Hence, as shown in FIG. 4, the communication module allows secure updates of the software or settings of the communication module and/or the hearing aid. Hence, simple updates may be announced via the hearing aid application and securely retrieved from the network.

It will be appreciated that the invention may be easily extended to other hearing aid services, including streaming services for streaming audio data received by the mobile user device via the wireless radio interface of the communication module to the hearing aid.

Figure 5:
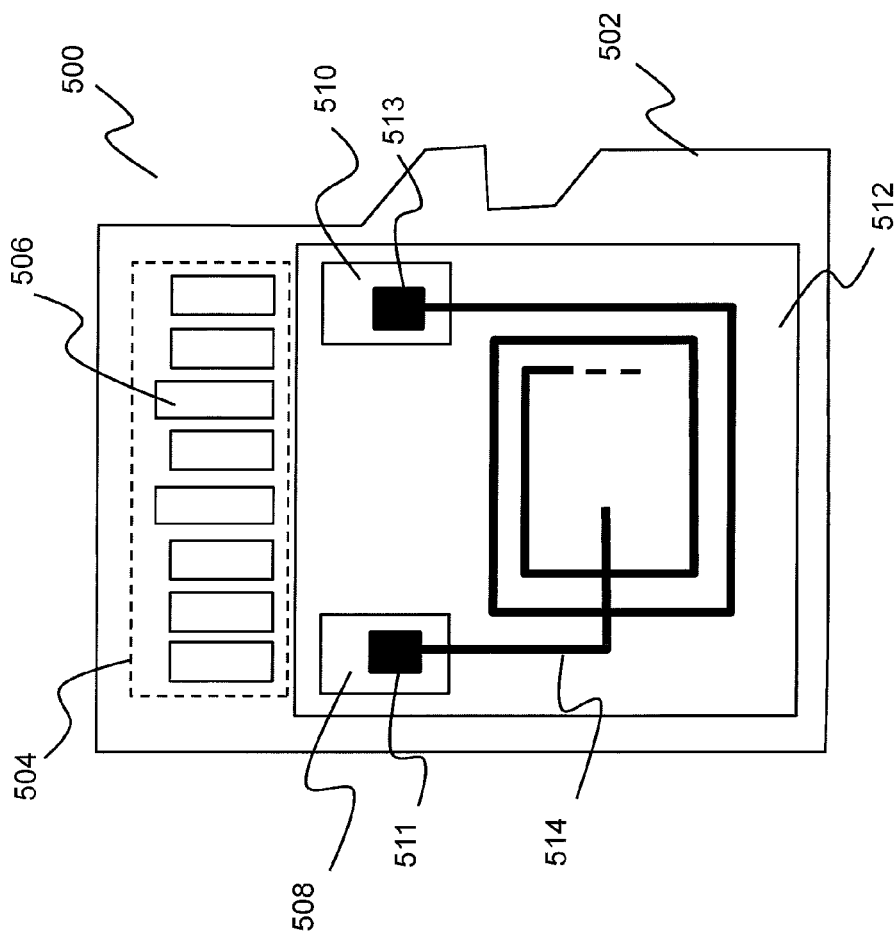
FIG. 5 depicts a communication module comprising an inductive coil structure according to an embodiment of the invention.

FIG. 5 depicts a communication module comprising an inductive coil structure according to an embodiment of the invention. In particular, FIG. 5 depicts the back-side of a communication module that can be used to configure a user device as a wireless controller for a hearing aid. Similar to the communication module described with reference to FIG. 1A, the communication module 502 may comprise a user device interface 504, a microcontroller, secure memory and a radio interface. The communication module may be configured on the basis of at least part of the process as described with reference to FIG. 2. After configuration, the radio interface of the communication module may be operated at a carrier frequency of a predetermined hearing aid that is identified on the basis of a hearing aid identifier that is stored in the memory of the communication module. Further, the microcontroller may use the audio codec and the protocol stack software in the memory of the communication module to set up a radio link with the hearing aid is registered with the communication module and in the user account of the user.

FIG. 5 shows the backside of an SD implementation of a communication module according to an embodiment of the invention. The backside of the module comprises an electrical contact configuration 506 for electrically connecting the communication module to the data bus of the mobile user device. In addition, the communication module may comprise external antenna contacts 508,510 that are electrically connected to the antenna controller. In an embodiment, the antenna contacts may be defined according to a SD standard.

An external antenna 512 may be electrically connected to the antenna contacts of the communication module. The external antenna may extend the reach of the radio interface of the communication module that is set by the on-chip RF antenna. In an embodiment, the external antenna may be configured to fit in the space that is defined by the communication module socket. To that end, the antenna may comprise a substrate 512 for supporting an inductive coil structure 514 comprising two electrical contacts 511,513. The electrical contacts may be positioned such that when the substrate is brought in contact with the surface of the communication module, the antenna contacts of the communication module and the antenna contacts of the inductive coil structure make electrical contact.

The coil structure may be a thin wire comprising an insulating coating that is glued onto the substrate.

Alternatively, a thick-film or thin-film technique may be used to form the inductive coil structure onto the substrate. Here, the substrate may be a plastic sheet comprising an adhesive so that it can be attached to the backside of the communication module. The size of the substrate and the inductive coil structure may be selected such that it can be attached to the backside of the communication module.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Although the figures, in particular FIGS. 1A and 5, depict a chip card, in particular a secure digital card, implementation of the communication module, it is submitted that these figures are not limiting the invention in any way. In particular, it is submitted that in this application the term communication module may include any chip card that can be configured as a communication interface between a mobile user device and a hearing aid. Examples of a communication module may include smart cards, e.g. contact smart cards (e.g. a SIM or ISIM card) or contactless smart cards, or a secure digital card, including an SD card that complies with one of the SD standards.

Hence, the communication module comprises a first interface for establishing communication between the user device and the communication module and a second interface for establishing communication between the user device and the hearing aid. Typically, communication between the communication module and the hear aid is based on a low energy communication link due to the energy constraints of the hearing aid. Preferably, a low energy communication link may be realized on the basis of a FM radio link, a low-energy Bluetooth communication link; or, field magnetic induction (FMI) communication link with said hearing aid. Communication between the user device and the communication link may be implemented on the basis of any type of communication link that can be established between the user device, a mobile phone, and the communication module.

The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for configuring a mobile user device as a wireless controller for a hearing aid, said mobile user device comprising:
   a communication module for wireless communication with said hearing aid, said communication module comprising a radio interface, an antenna and an antenna controller; and,
   a computer-readable memory storing a software application for remotely controlling said hearing aid on the basis of said communication module; said communication module being connectable to a configuration module on a computer or a server for configuring said communication module on the basis of hearing aid setting information;
   said method comprising:
   sending authentication information to said configuration module;
   receiving hearing aid setting information from said configuration module if said configuration module determines on the basis of said authentication information that access to said hearing aid setting information by said communication module is allowed; and,
   configuring at least part of said communication module and/or said hearing aid on the basis of said hearing aid setting information.

2. The method according to claim 1 wherein said hearing aid setting information comprises predefined or used-defined hearing aid settings.

3. The method according to claim 2 wherein said hearing aid setting information comprises predefined or used-defined audio and/or filter settings.

4. The method according to claim 1, said method further comprising:
   obtaining a first hearing identifier;
   establishing a wireless communication link between the communication module and the hearing aid;
   receiving a second hearing aid identifier from the hearing aid;
   determining successful configuration of the communication module on the basis of said first and second hearing aid identifiers.

5. The method according to claim 1 further comprising:
   rendering a graphical user interface comprising one or more touch-sensitive areas for controlling one or more parameters of said hearing aid;
   upon selecting at least one of said touch-sensitive areas, determining a user-selected parameter value for said hearing aid;
   instructing said communication module to transmit a hearing aid control message comprising said user-selected parameter value via said radio interface to said hearing aid, said hearing aid control message instructing a processor in said hearing aid to configure said hearing aid in accordance with said parameter value.

6. The method according to claim 1 further comprising:
   rendering a graphical user interface comprising one or more touch-sensitive areas for selecting one or more audio signals;
   upon selecting at least one of said touch-sensitive areas, receiving at least one of said one or more selectable audio signal;

instructing said communication module to transmit said audio signal via the radio interface of the communication module to said hearing aid.

7. The method of claim 1 wherein the one or more audio signals comprises an audio signal originating from a media player and/or a telephone module in said mobile user device.

8. The according to claim 1 further comprising:
rendering a graphical user interface comprising one or more touch-sensitive areas for selecting a predefined user configuration of said hearing aid;
upon selecting at least one of said touch-sensitive areas, determining predefined hearing aid settings and/or a hearing aid software update;
instructing said communication module to transmit a hearing aid control message comprising said predefined hearing aid settings and/or a hearing aid software update via said a communication link to said hearing aid, said hearing aid control message instructing a processor in said hearing aid to configure the hearing aid in accordance with said predefined hearing aid settings and/or a hearing aid software update.

9. The method according to claim 1 wherein the radio interface of said communication module is configured for setting up a FM-based radio communication link, a Bluetooth communication link; or, near-field magnetic induction (NFMI) communication link with said hearing aid.

10. A mobile device configured as a wireless controller for a hearing aid comprising:
a communication module for wireless communication with said hearing aid, said communication module comprising a radio interface, an antenna and an antenna controller;
a computer-readable memory for storing a software application for remotely controlling said hearing aid via said communication module;
wherein said communication module is connectable to a configuration module on a computer or a server for configuring said communication module on the basis of hearing aid setting information;
and, wherein said communication module comprises a microcontroller that is configured for: sending authentication information to said configuration module;
receiving hearing aid setting information from said configuration module if said configuration module determines on the basis of said authentication information that access to said hearing aid setting information by said communication module is allowed; and,
configuring at least part of said communication module and/or said hearing aid on the basis of said hearing aid setting information.

11. The mobile device according to claim 10 wherein said software application is configured for:
rendering a graphical user interface comprising one or more touch-sensitive areas for controlling one or more parameters of said hearing aid;
upon selecting at least one of said touch-sensitive areas, determining a user-selected parameter value for said hearing aid;
instructing said communication module to transmit a hearing aid control message comprising parameter value via said radio interface to said hearing aid, said hearing aid control message instructing a processor in said hearing device to configure said hearing device in accordance with said parameter value.

12. The mobile device according to claim 10 wherein said hearing aid setting information comprises predefined or used-defined hearing aid settings.

13. The mobile device according to claim 12 wherein said hearing aid setting information comprises predefined or used-defined audio and/or filter settings.

14. The mobile device according to claim 10 wherein said hearing aid setting information further comprises a first hearing aid identifier, wherein said microcontroller is further configured to:
obtain a first hearing aid identifier;
establishing a wireless communication link between the communication module and the hearing aid;
receiving second hearing aid identifier from the hearing aid;
determining successful configuration of the communication module on the basis of said first and second hearing aid identifiers.

15. The mobile device according claim 10 wherein the radio interface of said communication module is configured for setting up a FM-based radio communication link, a Bluetooth communication link; or, a near-field magnetic induction (NFMI) communication link with said hearing aid.

16. A computer program product comprising software code portions configured for, when run in memory of a computer of a mobile user device comprising, a communication module for wireless communication with a hearing aid, said communication module comprising a radio interface, an antenna and an antenna controller, and a computer-readable memory storing a software application for remotely controlling said hearing aid on the basis of said communication module; said communication module being connectable to a configuration module on another computer or a server for configuring said communication module on the basis of hearing aid setting information, executing a method comprising:
sending authentication information to said configuration module;
receiving hearing aid setting information from said configuration module if said configuration module determines on the basis of said authentication information that access to said hearing aid setting information by said communication module is allowed; and
configuring at least part of said communication module and/or said hearing aid on the basis of said hearing aid setting information.

* * * * *